(12) United States Patent
Belanger

(10) Patent No.: US 8,627,535 B2
(45) Date of Patent: Jan. 14, 2014

(54) FIVE BRUSH ROLLOVER WITH OVERHEAD SUPPORT

(75) Inventor: Michael Belanger, Novi, MI (US)

(73) Assignee: Belanger, Inc., Northville, MI (US)

( * ) Notice: Subject to any disclaimer, the term of this patent is extended or adjusted under 35 U.S.C. 154(b) by 1773 days.

(21) Appl. No.: 11/502,667

(22) Filed: Aug. 11, 2006

(65) Prior Publication Data

US 2008/0034517 A1 Feb. 14, 2008

(51) Int. Cl.
*B60S 3/06* (2006.01)

(52) U.S. Cl.
USPC ................................ 15/53.3; 15/53.1; 15/97.1

(58) Field of Classification Search
USPC ............................ 15/59.2, 3, 53.1–53.3, 97.1
See application file for complete search history.

(56) References Cited

U.S. PATENT DOCUMENTS

| | | | | |
|---|---|---|---|---|
| 3,035,293 | A | 5/1962 | Larson | 15/21 |
| 3,037,223 | A | 6/1962 | Lovsey | 15/21 |
| 3,090,981 | A | 5/1963 | Vani et al. | 15/21 |
| 3,233,264 | A * | 2/1966 | Nickl et al. | 15/53.2 |
| 3,271,803 | A | 9/1966 | Cirino et al. | 15/21 |
| 3,428,983 | A | 2/1969 | Seakan | 15/21 |
| 3,495,287 | A * | 2/1970 | Freimanis | 15/53.2 |
| 3,601,833 | A * | 8/1971 | Takeuchi | 15/53.2 |
| 3,626,536 | A * | 12/1971 | Napoli | 15/53.2 |
| 3,633,231 | A * | 1/1972 | Capra | 34/666 |
| 3,747,151 | A * | 7/1973 | Takeuchi | 15/53.2 |
| 3,783,466 | A * | 1/1974 | Bernardi | 15/53.2 |
| 3,793,663 | A * | 2/1974 | Lieffring | 15/53.3 |
| 3,793,667 | A * | 2/1974 | Capra | 15/53.2 |
| 3,798,696 | A | 3/1974 | Cirino | 15/21 E |
| 3,806,978 | A * | 4/1974 | Takeuchi | 15/53.3 |
| 4,007,053 | A * | 2/1977 | Gray | 134/6 |
| 4,024,598 | A * | 5/1977 | Miner | 15/53.2 |
| 4,035,862 | A * | 7/1977 | Ennis et al. | 15/53.3 |
| 4,039,014 | A * | 8/1977 | Sellars | 15/53.3 |
| D247,437 | S * | 3/1978 | Nelson | D32/4 |
| 4,225,995 | A * | 10/1980 | Ennis | 15/53.3 |
| 4,244,071 | A * | 1/1981 | Barber | 15/53.2 |
| 4,305,174 | A | 12/1981 | Pyle et al. | 15/53 A |
| 4,306,325 | A * | 12/1981 | Pyle et al. | 15/53.2 |
| 4,359,796 | A * | 11/1982 | Holbus et al. | 15/53.3 |
| 4,450,600 | A * | 5/1984 | Shelstad | 15/53.2 |
| 4,452,284 | A | 6/1984 | Eckstein | 139/383 |
| 4,453,284 | A * | 6/1984 | Schleeter | 15/97.3 |
| 4,769,868 | A * | 9/1988 | Pagnanelli et al. | 15/53.3 |
| 5,148,570 | A | 9/1992 | Crotts et al. | 15/97.3 |
| 5,279,013 | A * | 1/1994 | Krichbaum | 15/53.3 |

(Continued)

OTHER PUBLICATIONS

U.S. Appl. No. 11/371,474, filed Mar. 9, 2006, Michael Belanger.

(Continued)

*Primary Examiner* — Monica Carter
*Assistant Examiner* — Michael Jennings
(74) *Attorney, Agent, or Firm* — Young Basile Hanlon & MacFarlane PC

(57) ABSTRACT

A gantryless brush-type rollover car washer has an overhead support system for a longitudinally movable carriage. Four side brushes are pivotally mounted to the carriage and arranged in front and rear pairs, each of which can converge and diverge to cover all surfaces of a vehicle in a car washing location. A counterweighted pivotal top brush is also provided and mounted on the carriage. Opposite depending wheel washers are also provided. The pivot points for all five of the brushes are above the eye level of persons in a passenger vehicle being washed.

13 Claims, 8 Drawing Sheets

(56) References Cited

U.S. PATENT DOCUMENTS

| | | | |
|---|---|---|---|
| 5,325,559 A * | 7/1994 | Belanger et al. | 15/97.3 |
| 5,463,788 A * | 11/1995 | Ennis | 15/97.3 |
| 5,722,104 A * | 3/1998 | Wentworth | 15/53.2 |
| 5,930,859 A * | 8/1999 | Ennis | 15/53.3 |
| 6,264,754 B1 * | 7/2001 | Bowman | 134/6 |
| 6,372,053 B1 * | 4/2002 | Belanger et al. | 134/34 |
| 6,654,978 B2 * | 12/2003 | Bouchard | 15/3 |
| 7,293,316 B2 * | 11/2007 | Ennis | 15/53.3 |
| RE40,463 E * | 8/2008 | Belanger et al. | 134/34 |
| 7,506,394 B2 * | 3/2009 | Prater et al. | 15/53.2 |
| 8,051,521 B2 * | 11/2011 | Ennis | 15/53.3 |
| 8,099,816 B2 * | 1/2012 | MacNeil | 15/53.3 |
| 2003/0051302 A1 * | 3/2003 | Fazio | 15/53.2 |
| 2005/0235441 A1 * | 10/2005 | Ennis | 15/53.2 |
| 2005/0268411 A1 * | 12/2005 | Ennis | 15/53.2 |
| 2006/0168752 A1 * | 8/2006 | Levesque | 15/230.16 |
| 2006/0218734 A1 * | 10/2006 | Prater et al. | 15/53.2 |
| 2007/0174981 A1 * | 8/2007 | Smith et al. | 15/53.2 |
| 2007/0209129 A1 * | 9/2007 | Turner | 15/53.2 |
| 2008/0060150 A1 * | 3/2008 | Dollhopf | 15/53.2 |

OTHER PUBLICATIONS

U.S. Appl. No. 11/371,484, filed Mar. 9, 2006, Michael Belanger.
U.S. Appl. No. 11/202,563, filed Mar. 9, 2006, Michael Belanger.

* cited by examiner

FIVE BRUSH ROLLOVER WITH OVERHEAD SUPPORT

FIELD OF THE INVENTION

This invention relates to a brush-type rollover car washer and more particularly to a rollover car washer which is virtually free of enclosing side structures typical in such as gantry-type rollover washers.

BACKGROUND OF THE INVENTION

Rollover car wash systems are particularly popular for their space saving qualities as compared to tunnel or conveyor systems. The term "rollover" is used to define a car wash system or structure which carries out a vehicle washing process during which the vehicle being washed remains substantially in one position while the apparatus which delivers washing fluid and otherwise controls the washing function moves back and forth in a reciprocating fashion over the stationery vehicle. Rollover car washers may utilize brushes, felt strip curtains, high pressure sprays and/or combinations thereof. The term "car" is used herein to denote vehicles generally and passenger vehicles in particular.

Typical of rollover car washers is an inverted U-shaped gantry structure which rolls back and forth on floor mounted rails throughout the length of a car washing location. An example is shown in the U.S. Patent to Larson, U.S. Pat. No. 3,035,293 issued May 22, 1962. The Larson system includes a large cabinet-like gantry 12 carrying a pivotal, counter-weighted top brush and a pair of side brushes mounted on pivot arms to permit them to converge and diverge during the washing process. A similar system also having a large floor-mounted, reciprocating gantry is shown in the U.S. patent to Cirino, et al., U.S. Pat. No. 3,271,803 issued Sep. 13, 1966.

There are numerous criticisms to be made of the typical floor-mounted gantry-type, rollover car washers including but not limited to the two specific examples identified above.

The first criticism arises out of the fact that the gantries which are used to support the associated car wash equipment are large structures which, during much of the washing process, fully envelope the vehicle. This can evoke claustrophobic feelings in occupants of the vehicles being washed.

A second criticism arises out of the fact that track rollovers require that the floor of the washing location be cluttered with structural components including tracks which increase the difficulty of maintenance and which are constantly exposed to a corrosive atmosphere created by water and chemical sprays which are used in the washing operations.

A third criticism arises with respect to those brush-type gantry systems utilizing a non-pivoted track type top brush which moves through a pure vertical path thus requiring exceptionally long travel of the gantry to wash a stationary vehicle from end to end.

A fourth criticism arises out of the fact that the typical brush-type rollover uses only two side brushes, also requiring long travel of the gantry and providing insufficient washing contact at the front and rear surfaces of the vehicle.

These criticisms are exemplary and not exhaustive.

SUMMARY OF THE INVENTION

The present invention overcomes the deficiencies, drawbacks and criticisms of the prior art rollovers by eliminating the gantry in favor of an overhead carriage which in turn eliminates the enclosed claustrophobic appearance and feeling associated with prior art systems. It further eliminates much or all of the floor-mounted paraphernalia, provides a counterweighted, pivotal top brush and four side brushes having vertical axes of rotation and arranged in front and rear opposed pairs capable of converging and diverging movement during the washing operation.

A distinguishing characteristic of the gantryless rollover car washer is the fact that the longitudinal support for the equipment carriage is provided by one or more longitudinal carriage rails defined by beams located overhead of the car wash area. Therefore, there are no floor-mounted tracks. The longitudinal beams may in turn be supported by vertical posts or beams resting on the floor of the car wash location. Alternatively, the overhead longitudinal beams may also be supported by the walls of the car wash building or enclosure within a building, care being taken to provide adequate structural strength to support the weight of the system.

The overhead support system is preferably, but not necessarily, provided by beams which at various junctions are bolted and/or clamped together thereby to facilitate on-site assembly well as to provide dimensional adjustments or variations with a given design so as to accommodate different applications of the invention in the world of vehicles.

A further distinguishing characteristic is the fact that the pivot mounts for all four of the side brushes as well as the top brush are placed on the carriage at an elevation or height above the floor which is greater than the height of a vehicle to be washed in said wash location; for passenger cars, this is typically about 80 or 90 inches. This places the carriage and the pivots above the eye level of persons in vehicles being washed, thereby creating an open, visually pleasing and non-claustrophobic atmosphere for vehicle passengers during the entirety of the car wash experience.

In the preferred embodiment hereinafter described, a gantryless rollover car washer includes a carriage mounted on rollers which travel over two parallel, spaced longitudinal overhead rails which overlie the length of the washing location. The carriage includes a frame to which the side brush pivots and power cylinders are mounted, as well as the top brush and counterweight pivots and all are above eye level for persons in vehicles being washed. The frame includes one or more compartments which house such components as valves, hoses and chemical containers, giving the structure a clean, streamlined and open look.

These and other advantages of the present invention will be best understood from a reading of the following specification which describes a preferred embodiment of the invention in detail.

DETAILED DESCRIPTION OF AN ILLUSTRATIVE EMBODIMENT

Figure 1:
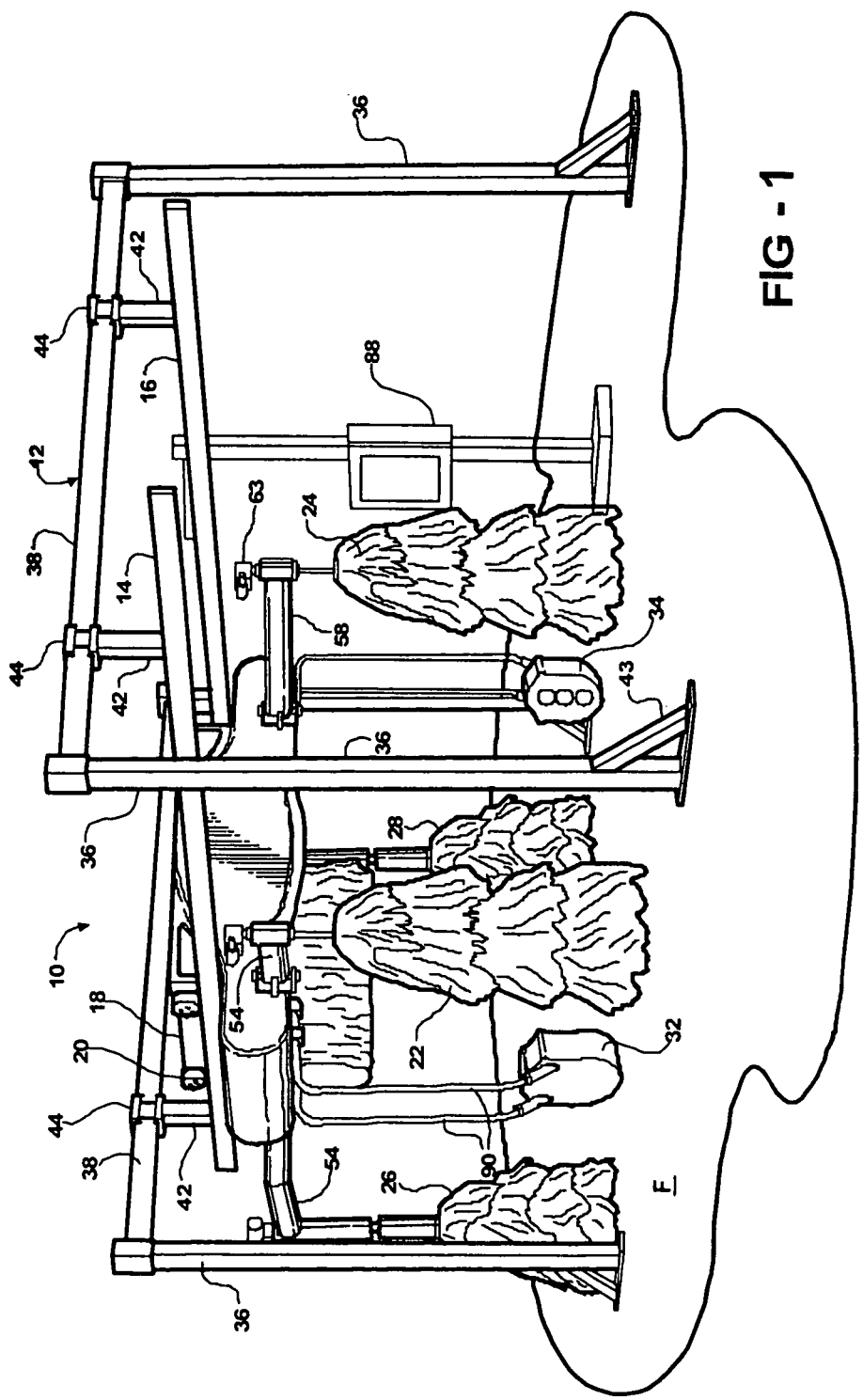
FIG. 1 is a perspective view of a gantryless rollover car wash system having a pivotal top brush and four quadralaterally arranged side brushes.

Referring now to the various figures of the drawing, there is shown a brush-type rollover car wash system 10 comprising as principal components a support structure 12 including spaced parallel longitudinal overhead rails 14 and 16 suspended approximately 10 feet above the floor F of a car wash location adapted to receive vehicle V parked therein. The system 10 further comprises a carriage 18 mounted for longitudinal movement along and over the rails 14 and 16 by way of rollers 20. The carriage 18 supports a pair of opposed pivotally mounted front brushes 22 and 24 and a pair of opposed pivotally mounted rear brushes 26 and 28. The brushes 22, 24, 26 and 28 are, therefore, said to be "quadralaterally" arranged, which means that they all have essentially vertical axes of rotation and are located at the four corners of a hypothetical rectangle having a plane parallel to that of the floor F. The brushes 22, 24, 26 and 28 are essentially conventional in the use of bristle or felt media. The brushes of both the front and rear pairs, as a result of the pivotal mountings to the carriage 18, can converge and diverge relative to one another under the control of power cylinders 23, 25, 27 and 28 mounted between the carriage 18 and crank arms 31, 33, 35 welded to the pivot arms 54, 56, 58 and 60. The pivot arms 54, 56, 58 and 60 support the side brushes 24, 22, 26 and 28 to wash the exterior surfaces of the vehicle V including the front and rear surfaces thereof.

The carriage 18 further pivotally supports a counterweighted top brush 30 having a substantially horizontal axis of rotation and also consisting of conventional bristle or felt media.

Also found in the illustrated embodiment are spray-type wheel washer units 32 and 34 which depend from the carriage 18 by way of parallel tubular conduits 90. The wheel washer units 32 and 34 are suspended just above the floor F on opposite sides of the washing location. The wheel washer units 32 and 34 may, for example, comprise high velocity spray nozzles as described in the co-pending application for U.S. Pat. Ser. No. 11/371,484 filed Mar. 9, 2006 the entire disclosure of which is incorporated herein by reference.

Looking now to the support system 12 in detail, four hollow box section vertical steel beams 36 are quadralaterally arranged on gusseted plates 43 so as to be supported by the floor F at essentially the four corners of the washing location for the system 10. The vertical supports 36 are approximately ten feet in length and approximately 6"×4", these dimensions and materials being exemplary rather than limiting in nature. Spaced parallel cross-beams 38 and 40 are arranged across the top of the car wash structure 10 approximately 20 feet apart in longitudinal spacing. Hanger beams 42 suspend the longitudinal rails 14 and 16 below the cross-beams 38 and 40 through the use of bolted couplings 44 best shown in FIG. 8.

Preferably the entire support frame structure 12 is bolted, rather than welded, together for ease of assembly at the car wash site. However, it is to be understood that welded and otherwise mechanically connected support beams can also be used.

It is also to be understood that the cross-beams 38 and 40 may also be mounted directly to the opposed side walls of a car wash building, care being taken to design or reinforce the walls of the building sufficiently to tolerate the weight of the car wash system 10 utilizing the present invention.

In the illustrated embodiment, the hanger beams 42 and the cross-beams 38 and 40 are located so as to result in approximately four feet of cantilevered length in the longitudinal rails 14 and 16 at the longitudinally opposite ends thereof. In short, the beams 14 and 16 are approximately 28 feet in length and have unsupported spans of approximately 20 feet between the front and rear hanger beams 42. Again, these dimensions are illustrative rather than limiting in nature.

Looking now to FIGS. 2-8, the carriage 18 is shown to comprise spaced parallel steel side plates 46 and 48 joined by a number of steel beam-like cross braces 50 and 51. Bearing blocks 52 are mounted on the lower sides of the plates 46 and 48 to provide serviceable pivotal mounting locations for the pivot arms 54, 56, 58 and 60 which support the quadralaterally arranged side brushes 22, 24, 26 and 28. The side brushes are rotatingly driven by conventional motors 63. Arms 54 and 56 are L-shaped to provide clearance for top brush 30. Arms 58 and 60 are straight. Spaced parallel arms 62 are mounted on the lower inside surfaces of the plates 46 and 48 by means of pivots 64 for the purpose of carrying the top brush 30 therebetween. A motor 47 of conventional design drives the top brush 30 for rotational movement.

The pivotal support arms 62 of the top brush 30 are provided with sector gears 65 which mesh with sector gears 70, mechanically connected to spaced parallel counterweight support arms 68 also pivotally mounted to the inside surfaces of the plates 46 and 48. Between the arms 68, the tubular steel counterweight 72 extends across the inside volume of the carriage 18. The mechanical innerconnection between the arms 62 and 68 by way of the gears 65 and 70 as such that as the top brush 30 descends, the counterweight 72 ascends to automatically provide at all times sufficient counterweighting effect for the top brush to reduce its vertical load on the Vehicle to approximately 10 pounds of down force. A control cylinder 74 modulates the pivotal movement of the counterweight arms by way of a lever arm 75 which is connected directly to the pivotal support 69 of the counterweight. The counterweighted top brush system is more fully described in the co-pending application Ser. No. 11/371,474, filed Mar. 9, 2006 and assigned to Belanger, Inc. The entire disclosure of that application is incorporated herein by reference.

Figure 5:
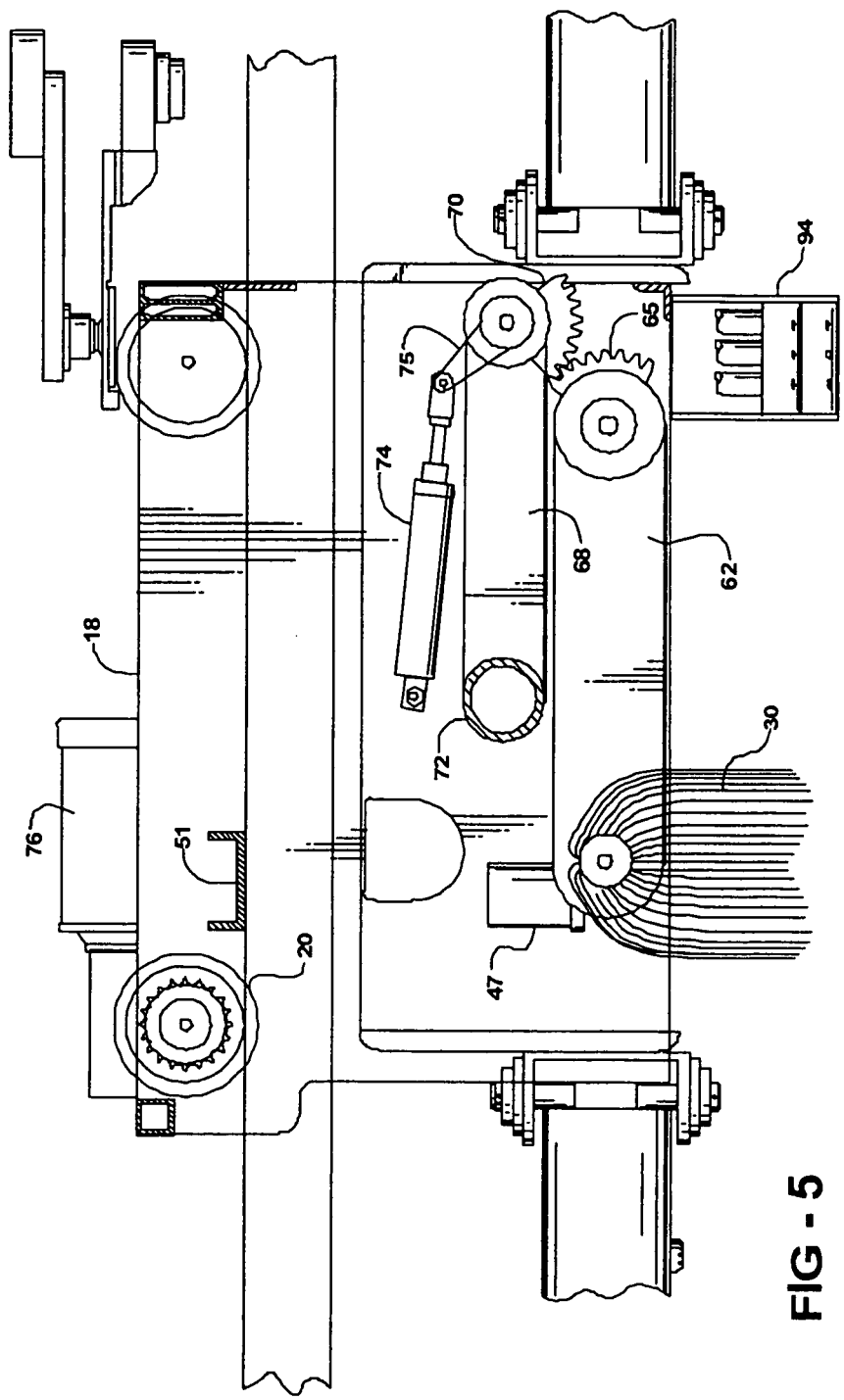
FIG. 5 is another view partly in cross-section of the internal details of the car wash carriage showing the drive system for movement along the overhead support rails, the pivot points of two of the side brush support arms, one in the front of the carriage and the other to the rear of the carriage and the mechanical gearing connection between the top brush support arms and the top brush counterweight arms.
Figure 6:
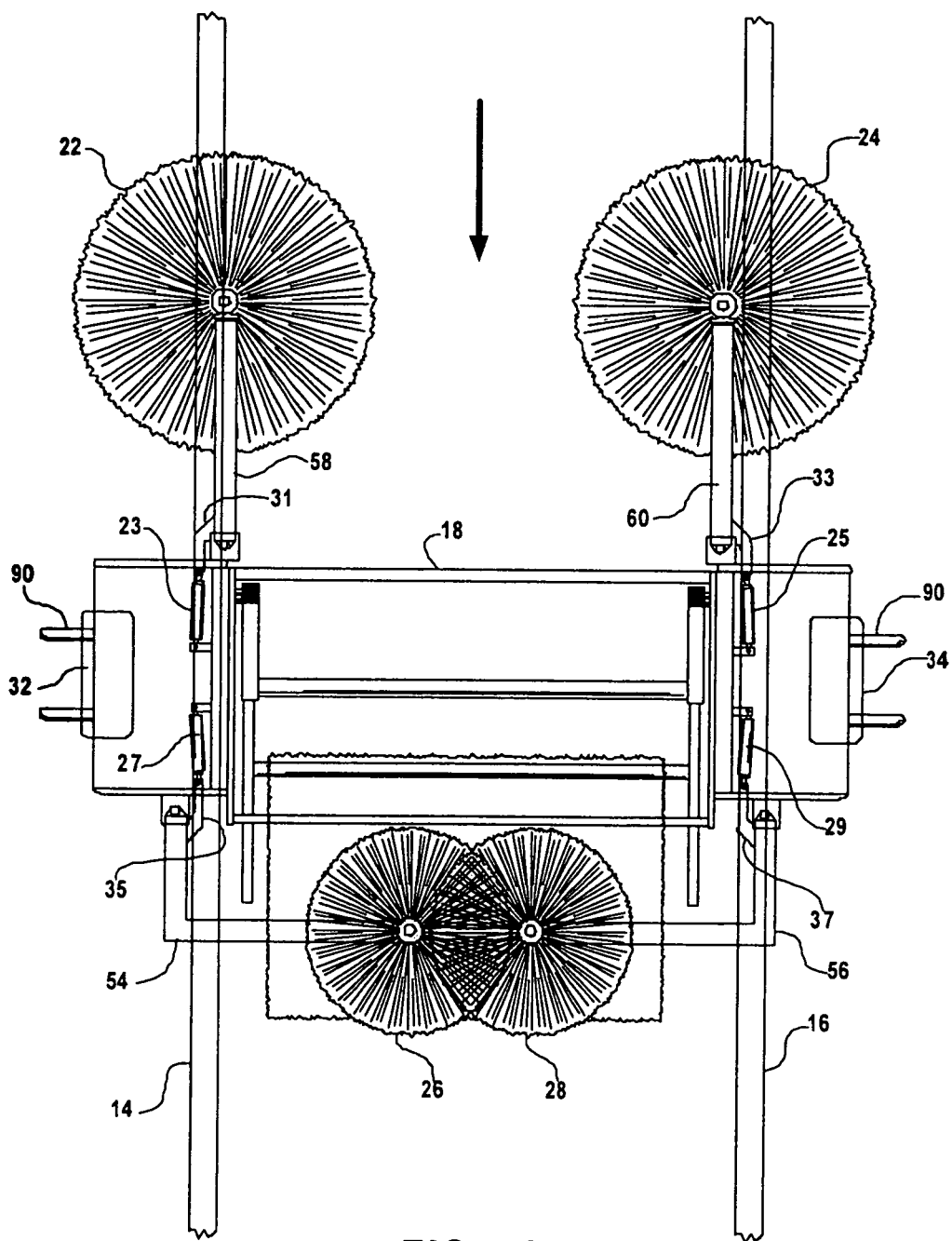
FIG. 6 is a plan view of the gantryless rollover structure of FIG. 1 showing one pair of side brushes in a diverged position and the other pair of side brushes in a converged position.

A-reversible traction motor 76 is mounted on top of the carriage 18 as shown in FIG. 5 to provide driving power to at least one of the rollers 20 such that the carriage may be moved back and forth along the overhead rails 14 and 16 as dictated by a program resident in the controller 88. The programmable controller 88 can be conventional in structure and implementation as will be apparent to those familiar with and skilled in the art of designing car wash controllers.

Figure 7:
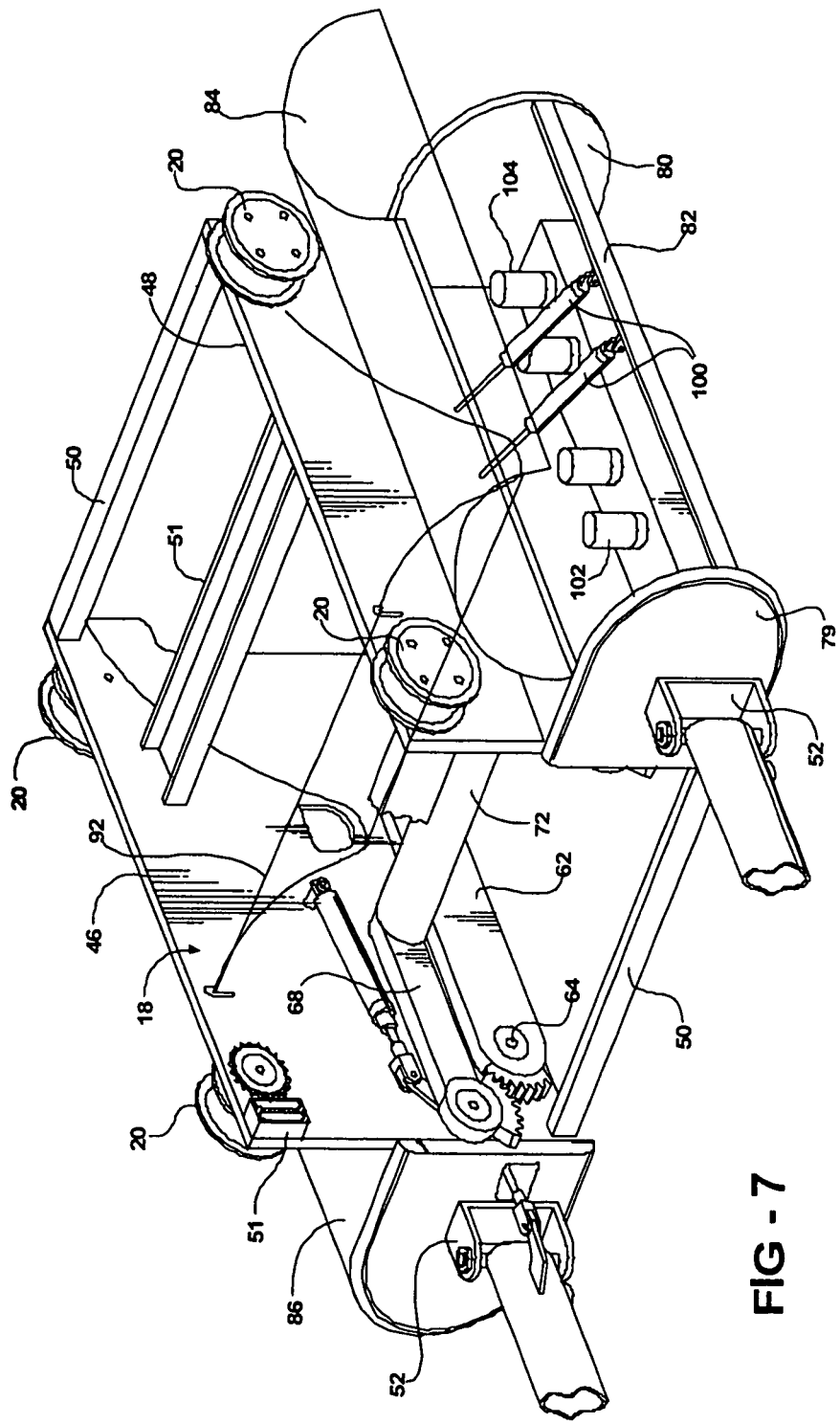
FIG. 7 shows a detail of the carriage including a compartment to one side of the carriage having a hinged door supported by gas struts system.

Referring now to the details of the carriage 18 it will be seen that a plurality of compartments are provided for the enclosed or semi-enclosed storage of components such as valves, solenoids, and containers 102 and 104 for chemicals as well as for hoses and conduits which direct water and other chemically laden fluids to the sprayers 94 mounted on opposite sides of the carriage 18. Shown in FIGS. 3 and 7, two such compartments 78 and 86 are provided on opposite sides of carriage 18. The right side compartment 78 is shown in FIG. 7 to comprise side plates 79 and 80 and a steel cross-brace 82 therebetween. A hinged cover 84 provides access to the interior of the compartment and may be supported in the open position by gas struts 100 connected between the cross-brace 82 and the interior surface of the cover 84. A suitable latch is provided. The lower half of the compartment 78 may be closed by a suitably contoured clip-on cover (not shown).

An identical compartment 86 is located on the opposite outside surface of the plate 46. A top compartment contoured to allow arcuate movement in the counterweight 72 is provided at 92 as best shown in FIG. 7. This compartment may also be accessed by one or more hinged doors.

The illustrative embodiment includes the wheel washers 32 and 34 as optional components. These wheel washers 32 and 34 are suspended from the carriage 18 and move therewith by way of spaced parallel tubular conduits 90 which not only provide structural support but also serve as passageways for fluid hoses to supply water and chemicals to the nozzles forming part of the wheel washers 32 and 34. The nozzles in the wheel washers 32 and 34 are more fully described in the co-pending U.S. application Ser. No. 11/371,484, filing date, Mar. 9, 2006 and assigned to Belanger, Inc.

Arcuate spray nozzle assemblies 94 are provided on opposite sides of the carriage to direct chemical laden washing fluids as well as rinsing fluids to the exterior surfaces of the vehicle V during the various phases of a typical car wash operation.

Figure 8:
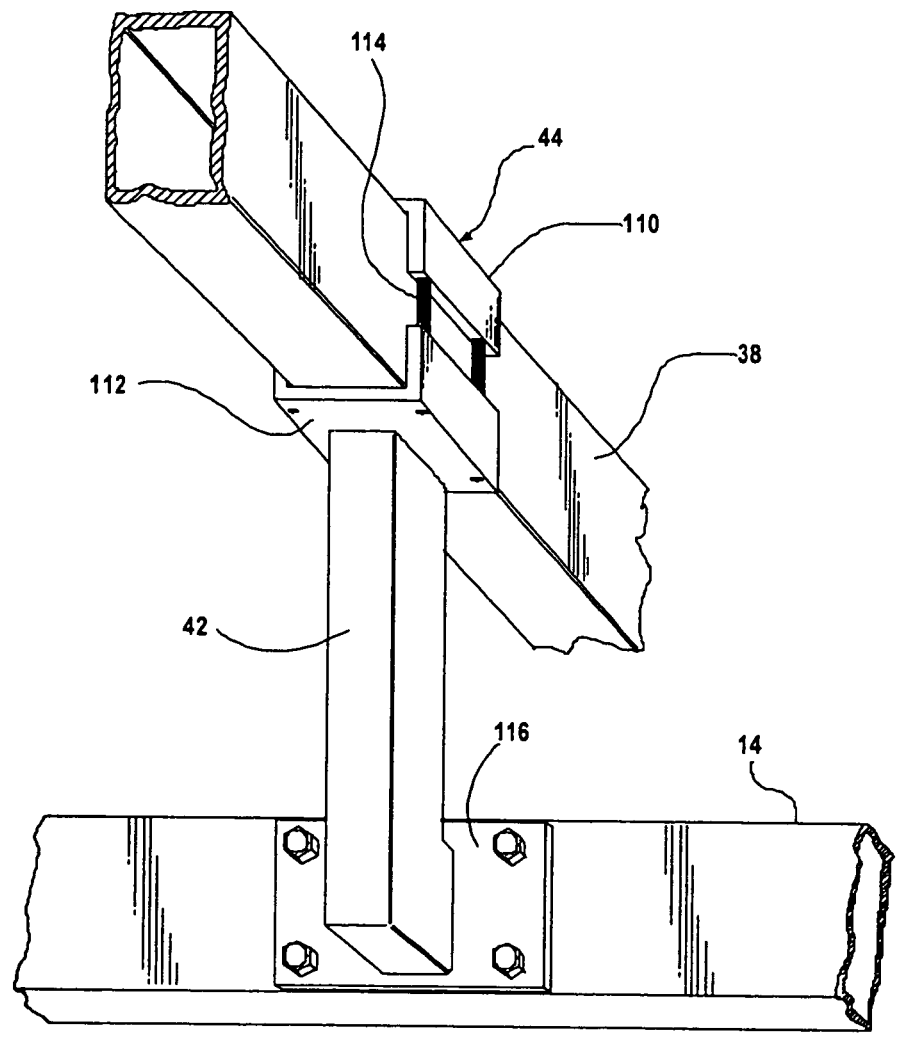
FIG. 8 is another perspective view of the car wash system showing couplings for beams in the support system.

Referring to FIG. 8, a representative section of the support structure 12 is shown to include cross brace 38, longitudinal rail 14 and a longer beam 42. The bolted coupling 44 comprises upper and lower clamps 110 and 112 held together by bolts 114. The lower clamp is welded to the top end of the beam 42. The lower end of the beam 42 is welded to a plate 116 which in turn is bolted to rail 14. Thus, the width of the support structure is easily varied to fit different carriage widths. The carriage width itself may be varied by changing the length of the cross pieces 50 and 51.

The following describes the typical sequence of operation of the car wash system 10 described above.

As a first step the vehicle V is brought into position within the rectangular area on the floor F defined essentially by the locations of the vertical support beams 36. A treadle and light system (not shown) may be used to provide instructional inputs to the driver of the vehicle V to properly position the vehicle. As an alternative to the treadle, a non-contacting sensor-type positioning system of the type described in the co-pending application Ser. No. 11/202,563, filing date, Aug. 12, 2005, the contents of which is incorporated herein by reference.

Next, the controller 88 is activated either manually or automatically to begin the car washing sequence. The sequence begins by positioning the carriage 18 at one extreme of its travel over the overhead longitudinal beams 14 and 16, typically the extreme of travel which corresponds to a position of the carriage 18 over the front end of the vehicle V. At this time, the sprayers 94 are activated with water or a pre-wash solution and the carriage 18 is caused to move from the front of the vehicle entirely to the rear of the vehicle to wet the entire exterior surface to be washed.

The rear brushes 26 and 28 are caused to converge to wash the rear end surface of the vehicle V. The brushes are then caused to diverge and the carriage drive system is again activated to move the carriage forwardly along so that the side brushes 22, 24, 26 and 28 contact and wash the front, side and rear-surfaces of the Vehicle.

Figure 2:
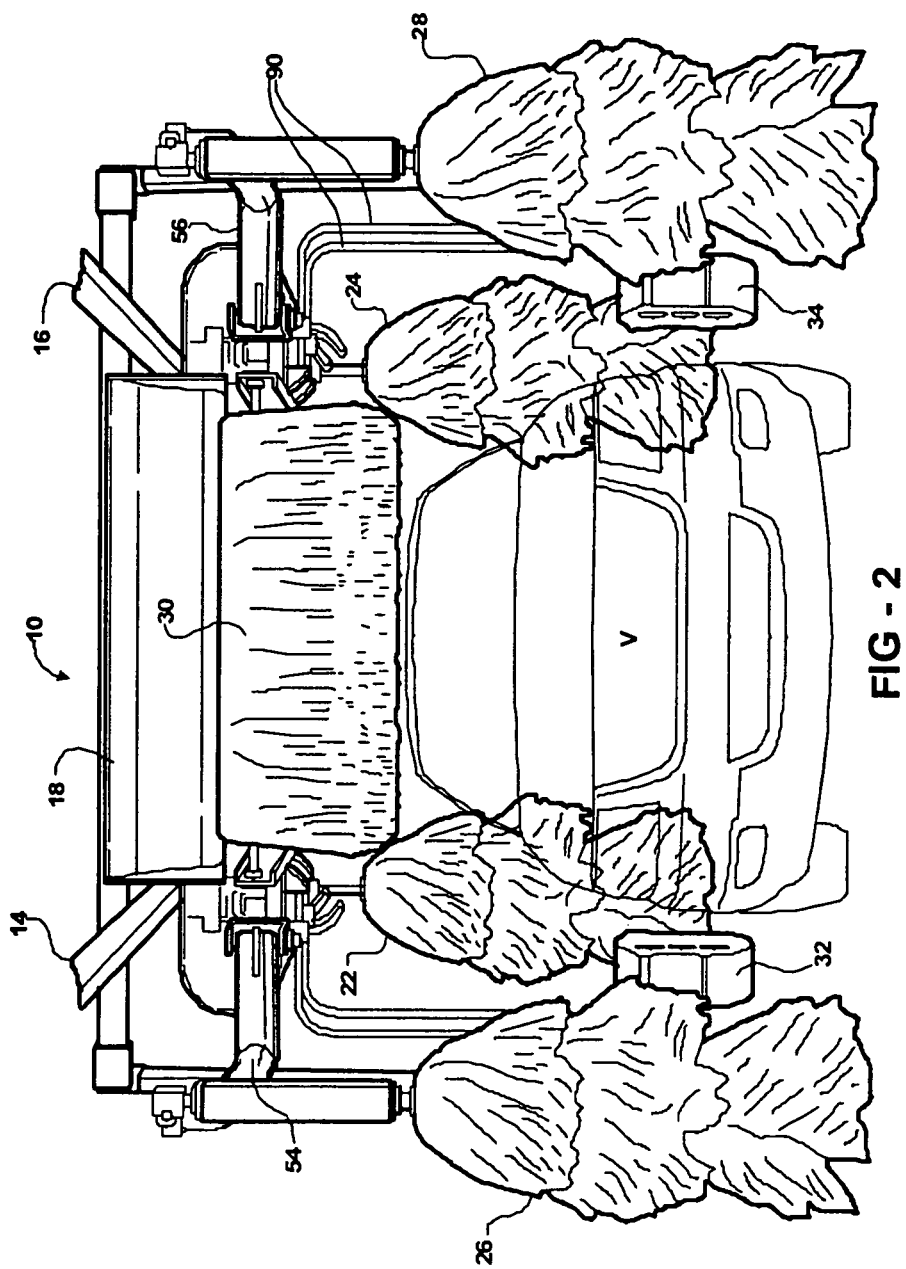
FIG. 2 is a perspective view of the car wash system from a vantage point which permits the viewer to see the front of a vehicle being washed in the car wash system.
Figure 3:
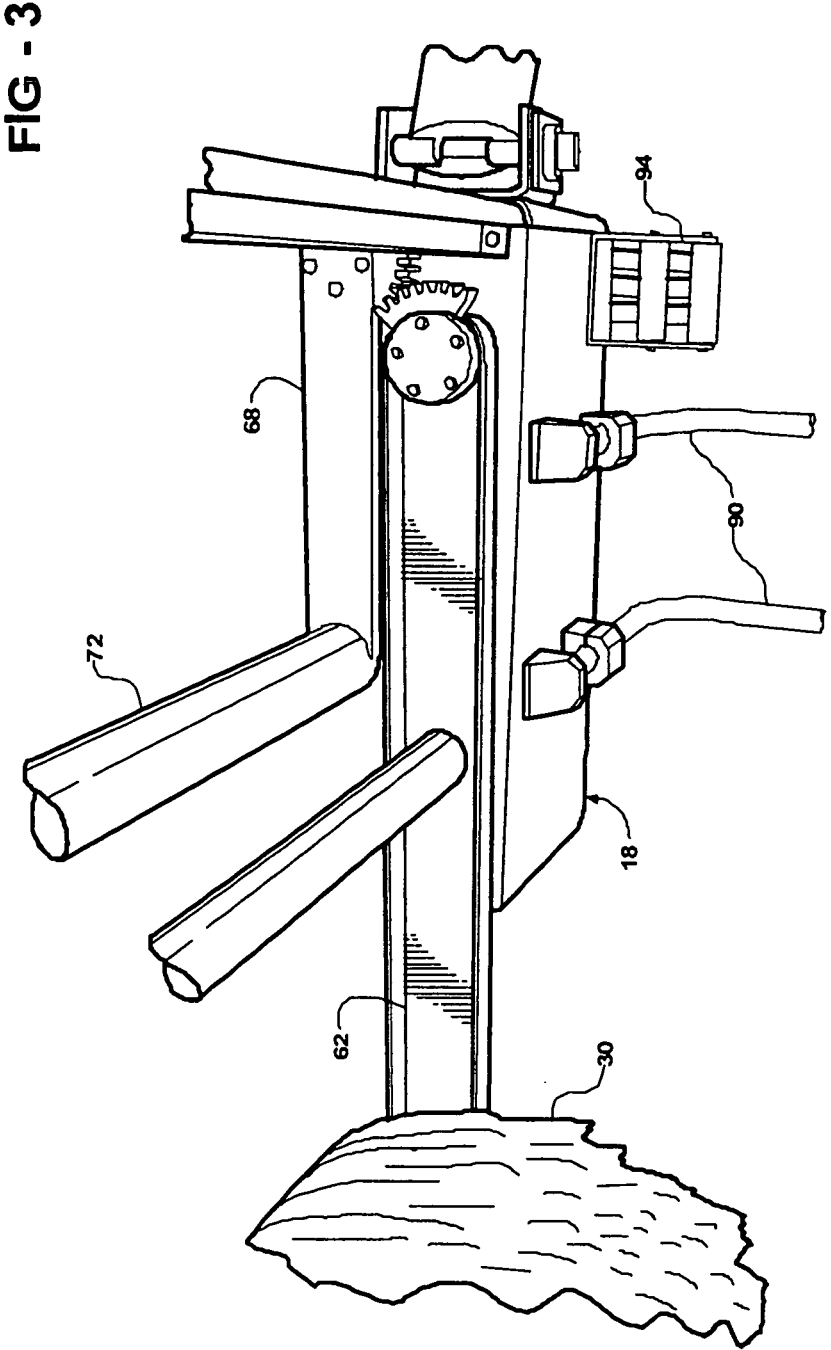
FIG. 3 shows details of the car wash carriage including a pivot arm for the top brush and another pivot arm for the top brush counterweight as well as the mechanical gearing which innerconnects the two arms.
Figure 4:
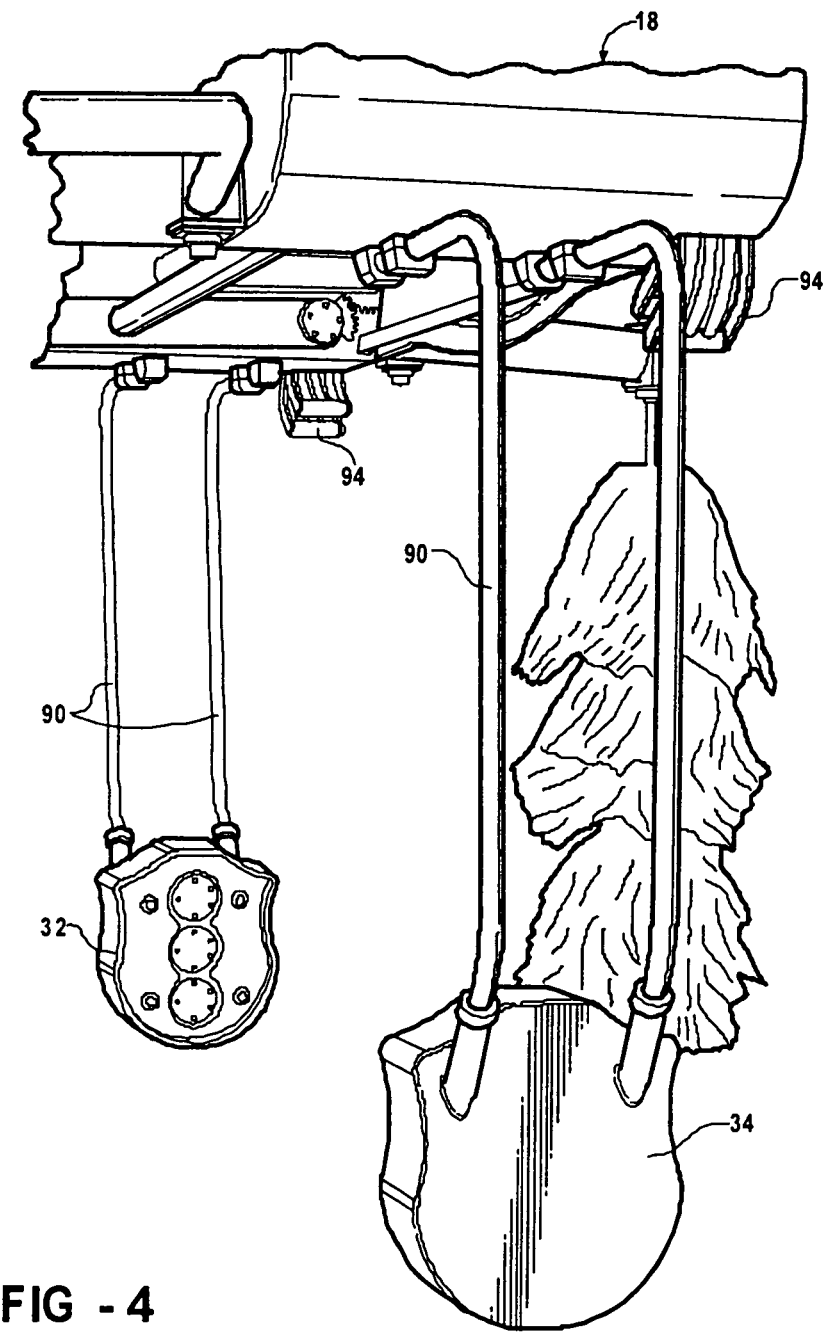
FIG. 4 is a perspective view from the side of the car wash structure of FIG. 1 illustrating an overhead cabinet for plumbing components, the counterweight system for the top brush, and an arrangement of spray-type wheel washers on opposite sides of and depending from the carriage.

Next the side brushes 22, 24, 26 and 28 are caused to diverge to the open position shown in FIG. 2 and the top brush 30 is lowered onto the front portion of the hood of the vehicle V and the carriage 18 is thereafter activated to move toward the rear of the vehicle V thus washing the hood, windshield, top, backlight and trunk of the vehicle V with the top brush 30. At that point, the top brush 30 is raised, the sprayer 94 is supplied with rinse water and the carriage 18 is caused to move the length of the vehicle in the car wash location to provide a rinsing action.

Obviously, there are a number of variations on the sequence described above which are possible using the structure described herein. Multiple wash passes and multiple rinse passes are among the variations which are available. Similarly, the wheel washers 32 and 34 can be supplied with washing solution and then rinse water in tandem with the activation of the brushes 22, 24, 26, 28 and 30 which contact and wash the other exterior surfaces of the vehicle. Wheel washing can be treated as an extra cost option during any particular car wash sequence.

What is claimed is:

1. A rollover car washer characterized by the absence of floor track mounted, vertically enclosing gantry structures located laterally of vehicles being washed while stationary in a wash location comprising:

a longitudinal support track mounted sufficiently overhead of a car wash location to permit a vehicle to pass thereunder;

a carriage mounted on said support track for reciprocal longitudinal movement therealong and over said location; said carriage having closed cabinetry enclosing and supporting chemical containers, valves and a motor for driving the carriage along said track;

a first side-by-side pair of side brushes of a vertical length approximating the vertical height of a passenger vehicle and having vertically depending axle shafts connected to horizontal support arms pivotally mounted to the carriage so as to extend outwardly from said carriage in use for relatively converging and diverging movement across said location sufficient to allow a vehicle to pass therebetween while said pair or brushes washes the outer surfaces thereof;

a second side-by-side pair of side brushes having a vertical length approximately equal to the vertical height of a passenger vehicle and having vertically depending axle shafts mounted to support arms which are pivotally connected to the carriage so as to extend rearwardly and outwardly from said carriage in use for relatively converging and diverging movement across said location and across the vehicle in said location and sufficiently to allow a vehicle to pass therebetween said first and second sets of side brushes being arranged in pairs which are longitudinally spaced from one another relative to the wash location; each of said side brushes having a top-mounted drive motor connected to a respective axle shaft the entirety of said carriage, cabinetry, support arms and top mounted drive motors for said side brushes being placed at elevations greater than the passenger sight lines from within a passenger vehicle in said location in all positions of said carriage and brushes, and said washer being entirely free of cabinetry and enclosing structure within said sight lines such that lateral visual obstructions to persons in vehicles being washed are minimized.

2. A gantryless rollover car washer as defined in claim 1 wherein said support track comprises a pair of spaced parallel beams extending longitudinally over said car wash location; said carriage being mounted for rolling movement along said beams.

3. A gantryless rollover car washer as defined in claim 2 wherein said carriage comprises rollers disposed on said beams, said drive motor being drivingly connected to at least one of said rollers that cause said carriage to travel along said beams.

4. A gantryless rollover car washer as defined in claim 1 further including a top brush having a raised position out of contact with a vehicle and lowered positions in contact with a vehicle, and a counterweight mechanically connected to said top brush for controlling movement of said top brush between said raised and lowered positions; said counterweight remaining above the normal sight lines of persons in the vehicle during all movements thereof.

5. A gantryless rollover car washer as defined in claim 4 further comprising a pair of parallel laterally space apart top brush support arms pivotally mounted to said carriage and a car wash brush mounted between said arms and extending laterally across said location and further wherein said counterweight comprises a pair of laterally spaced parallel support arms connected by gears with support arms of said top brush and a counterweight extending laterally parallel to said top brush axis across the location and between said counterweight support arms.

6. A gantryless rollover car washer as defined in claim 1 further including at least one wheel washer and narrow, tubular support and fluid supply means depending from said carriage on one side of said location for said wheel washer so as to dispose said wheel washer approximately midway between said first and second pairs of side brushes and at an elevation approximating the center of a wheel on a vehicle being washed, said tubular support/supply means being free of enclosing cabinetry.

7. A gantryless rollover car washer as defined in claim 6 wherein said wheel washer comprises a pod with spray heads directed toward a vehicle in said location and which is suspended from said carriage by a pair of parallel metal tubes.

8. A gantryless rollover car washer as defined in claim 1 further including spray means mounted to said carriage on laterally opposite sides thereof for directing fluid materials at a vehicle being washed.

9. A gantryless rollover car washer as defined in claim 1 wherein said carriage and all of said pivotal mounts are at least 80 inches above the floor of said car wash location.

10. A brush-type gantryless rollover car wash machine comprising:
    a set of overhead rails;
    a carriage mounted to said rails overhead of a car wash area of a height to allow a vehicle to pass thereunder; said carriage having closed cabinetry enclosing and supporting chemical containers, valves and a motor for driving the carriage along said track;
    a first pair of side brush support arms extending rearwardly horizontally outwardly from and pivotally mounted to said carriage so as to diverge and converge relative to one another to envelop a vehicle in a wash location serviced by said rollover car wash machine;
    a first side-by-side pair of side brushes having a vertical length approximating the vertical height of a passenger vehicle to be washed and dependingly mounted to respective ones of said first arms such that said arms, said carriage and said rails provide the sole support for said brushes;
    a second side-by-side pair of side brush support arms extending rearwardly horizontally outwardly from and pivotally mounted to said carriage so as to diverge and converge relative to one another to envelop a vehicle in a wash location serviced by said rollover car wash machine; and
    a second pair of side brushes having a vertical length approximating the vertical height of a passenger vehicle to be washed and dependingly mounted to respective ones of said second arms such that said arms, said carriage and said rails provide the sole supports for said brushes;
    each of said side brushes having a top-mounted drive motor connected to a respective axle shaft;
    all of the pivot points for said brush support arms being above the normal horizontal sight lines of persons in vehicles being washed by said first and second pairs of brushes; said wash machine in its entirety being free of gantry structure and cabinetry structure at and below the sight lines of persons in a vehicle being washed; and
    said overhead rails providing tracks for longitudinal movement of said carriage relative to vehicles in said car wash area, said car wash area being free of floor tracks for said carriage.

11. A brush-type gantryless rollover car wash machine as defined in claim 10 further comprising a top brush pivotally mounted to said carriage, the pivotal mounts of all of said top brush, first pair of brushes and second pair of brushes being above the height of a passenger vehicle in said locations in all positions of side carriage.

12. A brush-type gantryless rollover car wash machine as defined in claim 11 further comprising a pair of laterally opposite wheel washer pods having vertical support arms dependingly mounted to said carriage and on opposite sides thereof so as to direct sprays of wheel washing fluids inwardly toward the wheels of a vehicle in said car wash area.

13. A brush-type gantryless rollover car wash machine as defined in claim 10 further including a drive system carried by said carriage for selectively causing longitudinal movement of said carriage and all brushes attached thereto along said overhead rails.

\* \* \* \* \*